United States Patent Office 2,693,409
Patented Nov. 2, 1954

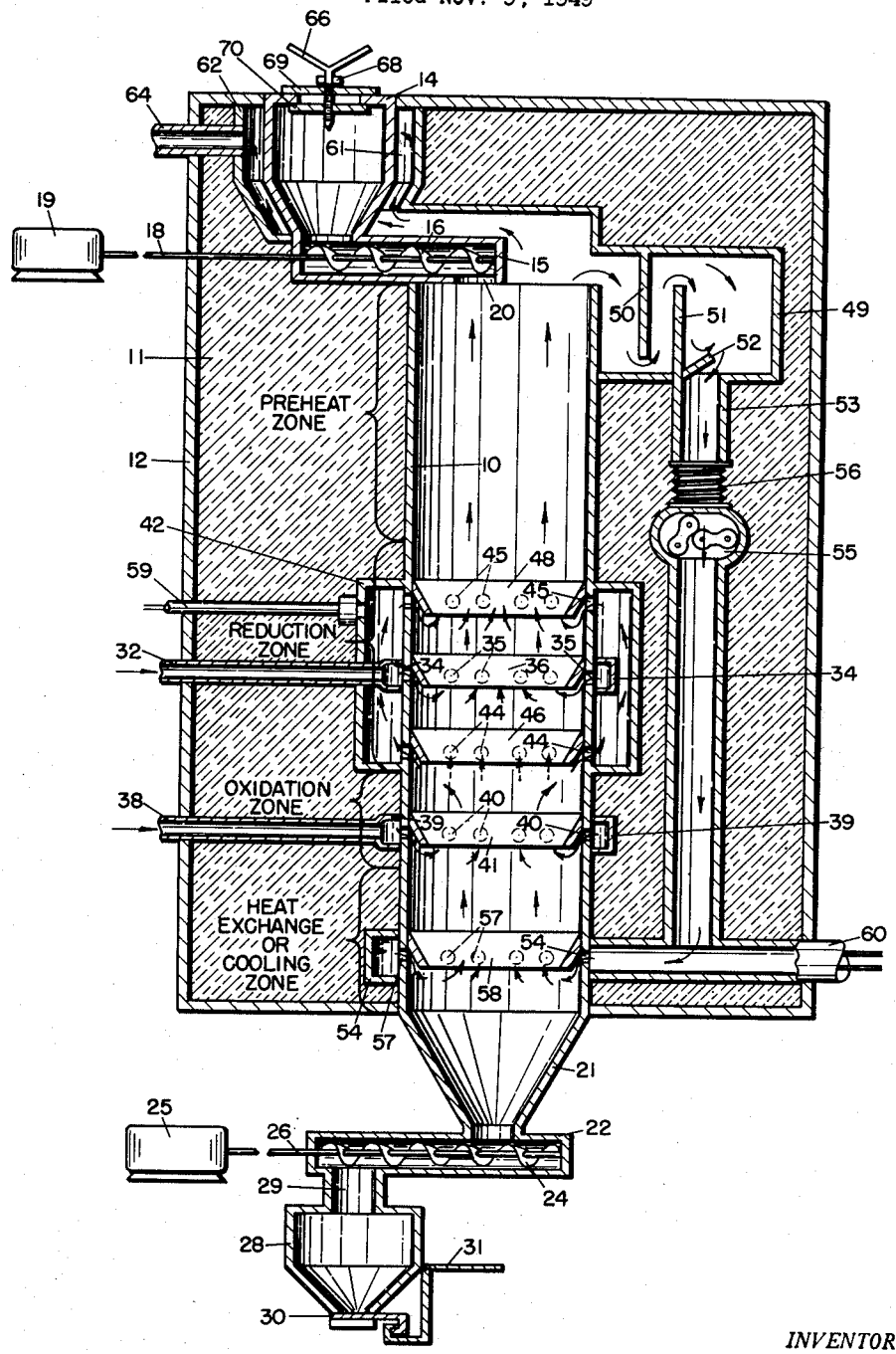

2,693,409

TREATMENT OF IRON ORE

Frank M. Stephens, Jr., Columbus, Ohio, assignor to Battelle Memorial Institute, Columbus, Ohio, a corporation of Ohio Application November 9, 1949, Serial No. 126,388

6 Claims. (Cl. 75—1)

This invention relates to a method for economically treating iron ore to obtain the iron values in the form of magnetic hematite and thus permit benefication of the ore by means of magnetic separation.

Iron is usually obtained from ores containing more than 52.5% iron by weight in the form of hematite ($Fe_2O_3$). These ores are known as "direct shipping ores", and have been depleted during recent years due to the drastic demand for iron and steel. Large deposits of low grade iron ores (formation material containing less than 52.5% iron) are, however, located. Because of the rapid exhaustion of the high grade iron ores, considerable research has been directed to the removal of iron from the low grade iron ores. The two processes most widely investigated are flotation and magnetic separation. Although many such processes have been devised which will provide a high degree of separation of the iron values in the ore from the remainder, none of these processes has yet been able to compete commercially with the production of iron from the higher grade ores.

All known flotation processes for iron ores are either inefficient or require expensive reagents. Furthermore, the low grade iron ores, such as Taconite, require grinding well past the point of liberation if an effective separation is to be made by flotation. This grinding is expensive.

Magnetic separation is, in itself, a relatively inexpensive step, but large tonnages of iron ores occur in the form of hematite ($Fe_2O_3$), a nonmagnetic material, rather than the magnetic mineral, magnetite ($Fe_3O_4$). To reduce hematite to magnetite requires large quantities of heat which would become a major source of expense when hundreds of thousands of tons of material are handled daily.

It is therefore desirable, in order to utilize the lower grade iron ores, to devise processes and apparatus which are capable of handling extremely large quantities of material in relatively short periods of time at a very low cost per ton.

One of the primary objects of this invention is to provide a method for economically treating iron ores to transform the nonmagnetic hemtite to magnetic hematite.

Another object of this invention is to provide a method of transforming nonmagnetic iron in iron ores, particularly low grade iron ores, to magnetic hematite in such a manner that no external heat need be added to maintain the continuous transformation.

A further object of this invention is to provide a method for reducing hematite to magnetite, and oxidizing the magnetite under predetermined conditions to produce magnetic hematite and, thus, to provide heat for the reducing reaction.

Still another object of this invention is to provide an apparatus which may be used to perform the method constituting this invention.

Other objects and advantages of this invention will become apparent to those skilled in the art from the following description.

An example of one of the many types of apparatus that may be used to perform the method constituting this invention is shown in the accompanying drawing in which Figure 1 is a schematic view, partly in section, of such an apparatus indicating various reaction zones and the flow of gases in the apparatus, In general, the present invention relates to a method wherein iron ore is heated gradually until it attains a temperature sufficient to enable it to react readily with a reducing gas. When the ore has attained that temperature, it is then treated with a reducing gas to reduce the hematite ($Fe_2O_3$) to magnetite ($Fe_3O_4$). Reducing gases which may be used are hydrogen, carbon monoxide, a combination of hydrogen and carbon monoxide, water gas, producer gas, or reformed natural gas. The magnetite is then treated with an oxidizing medium, such as air, or air enriched with oxygen, at a temperature below 950° F. to obtain the gamma form of hematite which is magnetic and is hereinafter referred to as "magnetic hematite." The hot magnetic hematite is then cooled by passing an inert heat transfer gas through it, such as nitrogen, steam, a mixture of the two gases, etc. and the heat transfer gas is then passed through the oxidizing zone to take up the heat produced therein. Preferably, the heat transfer gas which has now accumulated the products of combustion from the oxidizing zone, is by-passed around the reducing zone to avoid dilution of the reducing gas. This heat transfer gas may be passed directly from the oxidizing zone to a preheating zone in order to preheat the ore prior to its being raised to the temperature necessary to effect reduction. After passing through the unheated body of the ore, the heat transfer gas has given up most of its heat and is at a relatively cool temperature as compared to that of the hot magnetic hematite so that it may be recirculated through the magnetic hematite to cool it and thus continue the cycle. Water in the form of steam is picked up by the heat transfer gas from the water in the ore. When the reducing agent or one component of the reducing agent is hydrogen, water is also produced during the reduction of the hematite. This water vapor contributes materially to the heat transfer properties of the recirculated gases. Since the heat produced by the oxidation of magnetite to magnetic hematite is more than sufficient to heat the unheated ore to the temperature required for reduction, this double reaction process requires no external heat other than that used to start the process by heating the original batch of ore.

In order to obtain sufficient heat from the oxidation of magnetite to magnetic hematite to maintain the reduction of hematite to magnetite, it is essential that the ore used contain at least 15 per cent by weight of iron in the form of hematite. This is a theoretical lower limit, but most apparatus which would be used to perform this process loses so much heat that it is desirable to use ore containing at least 20 per cent by weight of iron as hematite and preferably not less than 25 per cent.

In starting the process, auxiliary heat is needed to bring the ore in the reducing area up to temperatures exceeding 660° F. but preferably not more than 800° F., and to bring the ore and gases in the oxidizing zone up to temperatures at which the oxidizing action will take place. Although such oxidizing temperatures may vary between 660° and 950° F., temperatures in excess of 800° F. are preferred. After the ore has been heated sufficiently to start the reduction of hematite to magnetite the auxiliary heat source may be removed.

While the reduction of hematite to magnetite will theoretically proceed at room temperature, it is desirable that the ore be heated to 660° F. by the time it reaches the reducing zone in order to produce a commercially practicable rate of reaction in the reducing zone. Preferably a temperature of at least 730° F. should be attained. The upper limit attainable in the preheating zone, will be determined only by the temperature of the reaction in the oxidizing zone, which should not exceed 950° F., and preferably not more than 930° F. Thus, the temperature in the reducing zone will be some temperature above 660° F. and below 950° F.

In the reducing zone the hematite is reduced to magnetite according to the following equations when the reducing agent is hydrogen, carbon monoxide, a mixture of hydrogen and carbon monoxide, water gas, producer gas, or reformed natural gas.

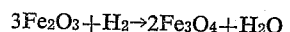

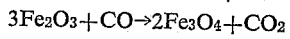

It is essential that the reducing agent be gaseous in order to effect the reduction at the low temperatures necessary. Organic gases such as methane and ethane require too high temperatures before the reducing action proceeds at anything approaching a satisfactory rate of speed. Although carbon dioxide which is produced by the oxidation of carbon monoxide provides a satisfactory inert heat transfer medium, it is preferable that the reducing gas contain hydrogen so as to form water upon reduction. Since water in the form of steam has almost twice the specific heat, weight for weight, of other inert gases, it provides a much more efficient inert heat transfer gas than any other readily available medium. Consequently, when reducing gases are employed which do not produce water during the reduction reaction, water may be added in order to obtain the most economical operation of the present invention.

At least 25% to about 150% additional reducing gas should be added over and above the theoretical amount required in order to increase the rate of reaction. When the theoretical amount of reducing gas is used, the rate of reaction is too slow to be commercially feasible; thus, the lower limit as to the amount of reducing gas added will be fixed in each case by that amount required to produce a commercially feasible rate of reaction. Hydrogen or carbon monoxide in amounts more than 80% by volume of the total gas should not be used, because there is danger of reducing the hematite to metallic iron when these gases exceed that concentration. As the ore passes through the reducing zone, it is cooled slightly, but to an extent insignificant compared to its original temperature.

In the oxidizing zone, the magnetite ($Fe_3O_4$) which has been formed in the reducing zone reacts with oxygen according to the following equation:

$$2Fe_3O_4 + \tfrac{1}{2}O_2 \rightarrow 3Fe_2O_3 \text{(Gamma)}$$

The oxidizing gas is preferably an inert gas containing oxygen. Other oxidizing gases which give up oxygen from their constituent molecule, usually become reducing gases in the "deoxidized" form. Since the oxidizing reaction depends upon the establishment of a satisfactory equilibrium, the presence of reducing gases in the oxidizing zone definitely hamper the forward action of this reaction. One very cheap and quite satisfactory oxidizing medium is air, either with or without additional oxygen. Mixtures of inert gases, preferably those formed in the reaction, such as nitrogen, steam, argon, etc., with oxygen may be employed, but air is by far the most logical oxidizing medium because of its extremely low cost. Steam enriched with oxygen may also be used, since steam is an inert gas at the temperatures employed in the present apparatus and process.

Somewhat less than the theoretical amount of oxygen required should be introduced into the oxidizing zone, because it is highly desirable to prevent any oxidizing gases from entering the reducing zone. The reason for this is readily apparent when it is considered that one gram molecular weight of oxygen will react with two gram molecular weights of hydrogen or carbon monoxide, which in turn will react in the reducing zone with 6 gram molecular weights of $Fe_2O_3$ to produce four gram molecular weights of magnetite. If the hematite is never reduced, the iron contained therein is completely lost. Even though a portion of the magnetite is not oxidized, this magnetite will still be reclaimed during the magnetic separation, since it, like the gamma hematite, is magnetic. It is only critical that enough of the magnetite be oxidized to provide sufficient heat to preheat the ore to a temperature adequate to carry on the reducing action.

Gamma hematite can be made from magnetite only by heating the magnetite in an oxidizing atmosphere at temperatures within the ranges of 390° F. to 950° F. In order to make the process continuous, there must be a temperature gradient from the oxidizing zone to the reducing zone. Consequently, the higher oxidizing temperatures are preferable. Reconversion of the gamma hematite to nonmagnetic alpha hematite at 950° F. is limited to 2% or 3% by cooling the ore immediately following the oxidation step.

The temperature in the oxidizing zone is controlled by the rate of oxidation, which in turn is controlled by the heat transfer gas passing through the oxidizing zone. When air is employed as the oxidizing gas, the oxygen content is constant so that the amount of oxygen admitted in a given period is dependent solely on the rate of admission of the air. Where oxygen is added to the air or other medium, such as nitrogen, the rate of reaction in the oxidizing zone will depend both on the amount of oxygen added and on the rate of addition of the oxidizing medium. The inert heat transfer gas acts as a diluent in the oxidizing zone and may be used to control the rate of the oxidizing reaction. Another advantage resulting from the passage of the heat transfer gas through the oxidizing zone is that the oxidizing gas is spread over a wider area so that a more uniform oxidizing action occurs over a relatively wide span or zone within the oxidizing zone. By spreading the oxidizing action over a relatively wide zone, localized hot spots may be thus avoided.

As the oxidizing medium passes through the oxidizing zone, the oxygen is removed therefrom and inert gases pass out of the oxidizing zone toward the reducing zone.

The inert heat transfer gas is made up of the combination of the gases remaining after the reducing agent and the oxidizing agent have performed their respective functions. Thus, where hydrogen is the reducing gas, and air is the oxidizing gas, the hydrogen will have combined with the oxygen in the $Fe_2O_3$ to produce steam which is a relatively inert medium at temperatures involved in the present method. The oxygen from the air reacts with the magnetite so that only the nitrogen passes from the oxidizing zone. Nitrogen is a relatively inert gas and the combination of steam with nitrogen is advantageous since steam has a specific heat of approximately twice that of ordinary inert gases. Thus, the heat transfer action of this particular combination of gases is very effective and contributes to the economical operation of the process. The exact nature of the inert heat transfer gas, in a given case, will depend, consequently, on the particular reducing gas and oxidizing gas employed. When the cool heat transfer gas comes in contact with the hot magnetic hermatite it will cool the magnetic hematite preferably to a temperature not exceeding about 250° F. To do this, of course, the heat exchange gas, itself, must be at some temperature below 250° F. However, it is highly desirable to have this heat transfer gas maintained at all times above 212° F. in order to avoid the condensation of large volumes of water therefrom.

The functions performed by the heat transfer gas are many and important. In the first place, the heat transfer gas dilutes the oxidizing medium so as to spread the zone of the oxidizing reaction, as above mentioned. Also, the heat transfer gas helps control the temperature of the oxidizing zone by removing the heat therefrom and by diluting the oxygen still further. The most important function performed by the heat transfer gas is the transfer of heat from the oxidizing zone to the ore in the preheating zone. It should be noted in addition, that the heat transfer medium is utilized to cool the hot gamma or magnetic hematite which has been formed. This cooling action is doubly important in that it cools the ore to a temperature where it may be easily handled and it removes the heat therefrom in order to retain it within the unit and permit a cyclical action independent of heat from any outside source.

This cyclical action obtained by recirculating the heat transfer medium, and the various functions dependent thereon, constitutes a vital part of the present process without which this invention would not be practicable.

It is readily apparent from the above description that the present invention entails several economical features not encountered in the prior art. One of the most outstanding features of this invention is the fact that no external heat is required once the process is in operation. Only the addition of reducing and oxidizing gases is required to maintain the reaction and obtain the iron values from the low grade iron ores. As to the gases used, one molecule of hydrogen or carbon monoxide reduces three molecules of nonmagnetic hematite to produce two molecules of magnetite. Only one-half molecule of oxygen is required to oxidize two molecules of magnetite to produce three molecules of gamma hematite. It is thus apparent that very small amounts of reducing gases and oxidizing gases are required to treat effectively large amounts of ore.

Furthermore, this invention may be practiced in relatively simple apparatus that can be constructed at low cost.

It is to be understood that the process constituting this invention may be performed in a variety of apparatus. As an example of one of the many types of apparatus which may be used to perform the process constituting this invention, reference may be had to the accompanying drawing in which 10 is a reaction chamber, made of a material having suitable refractory properties, and is surrounded by a suitable insulation material 11, such as vermiculite. A metal shell 12 is employed to hold the insulation 11 in place about the reaction chamber 10. A hopper 14 is disposed above the reaction chamber 10 and is provided with a housing 15 in which a feed screw 16 is rotated on a shaft 18 by means of a motor 19. The housing 15 is provided with an outlet 20 opening into the reaction chamber. At the bottom of the reaction chamber a funnel 21 is provided which opens into a housing 22 wherein a feed screw 24 is rotated by a motor 25 through the drive shaft 26. The lower part of the housing 22 is provided with an opening 29 which connects the housing 22 with a discharge hopper 28. The bottom of the hopper 28 is closed by a lid 30 which may be withdrawn by a lever 31. Midway in the reaction chamber 10 there is provided a pipe 32 which connects with a manifold 34 surrounding reaction chamber 10. A plurality of ports 35—35 extend around the periphery of the reaction chamber at that point which is surrounded by the manifold 34 and connect the manifold 34 with the interior of the reaction chamber. A skirt 36, made of steel or some other suitable material, is fastened to the interior of the reaction chamber 10 at a point above the ports 35—35 and extends down below those ports but is spaced at the bottom thereof from the walls of the reaction chamber 10. The skirt 36 prevents ore traveling downwardly through the reaction chamber 10 from clogging the ports 35—35.

Between pipe 32 and the bottom of the chamber 10, a pipe 38 is provided which is connected to a manifold 39 which surrounds the reaction chamber. A plurality of ports 40—40 are provided in the wall of the reaction chamber and permit the passage of gas from the manifold into the reaction chamber. A skirt 41 is provided in conjunction with the ports 40—40, similar to the skirt 36.

A by-pass manifold 42 surrounds the reaction chamber 10 and the manifold 34. This by-pass manifold 42 is provided with a series of lower ports 44—44 and upper ports 45—45 which are in turn provided with skirts 46 and 48 respectively. At the upper end of the reaction chamber 10 and just outside thereof a filter box 49 is provided having baffle plates 50, 51 and 52. A return conduit 53 connects the filter box 49 with a manifold 54. A positive displacement blower 55 is shown, and a steel bellows 56 is provided adjacent the blower to offset any expansion and contraction of the conduit 53 due to the heating or cooling of the gases passing therethrough. A plurality of ports 57—57 is provided within the manifold 54 in the wall of the reaction chamber 10, and a skirt 58 similar to skirts 41, 46, 36 and 48 is also provided. Heaters 59 and 60 are connected to the by-pass manifold 42 and the manifold 54, respectively, in order to provide heat when the apparatus is first being started.

A heating chamber 61 is formed around the hopper 14 by means of a jacket 62 spaced therefrom. A duct 64 leads from the heating chamber 61 and is connected to an exhaust fan (not shown). Thus, the gases are drawn through the heating chamber 61 to heat the ore in the hopper 14.

The hopper 14 may or may not be provided with a lid, but an air-tight lid is desirable under certain conditions of operation of this apparatus. Such a lid is shown in Figure 1 wherein a wing screw 66 having a bushing 68 thereon passes through a lid 69 in such a manner that the bushing 68 bears against the top of the lid. The shank of the wind screw 66 is sufficiently long to pass through an opening in the top of the hopper 14 and screw-threadedly to engage a plate 70.

In utilizing this apparatus to perform the process constituting this invention, ore is introduced into the hopper 14. The ore is transferred from the hopper 14 to the reaction chamber 10 by means of the feed screw 16. In starting up the apparatus disclosed in the accompanying drawing, the reaction chamber 10 is substantially filled with a low grade iron ore. The blower 55 is turned on to force inert heat transfer gases through the ports 57—57 and up through the reaction chamber 10 so as to carry along the oxidizing and reducing gases admitted through the ports 40—40 and 35—35, respectively. The heater 60 is turned on to provide sufficient heat to bring the ore in the oxidizing area up to temperatures at which the oxidizing action will take place. The heater 59 is employed to heat the ore in the reducing zone to the desired temperature.

After the ore has been heated sufficiently to start the reduction of the hematite to magnetite, both of the heaters may be turned off and the movement of the ore through the reaction chamber commenced by the operation of the feed screw 16 and the discharge screw 24. It will be obvious to one skilled in the art that the speed of the feed screw must approximate that of the discharge screw since the reaction chamber is of constant volume. The speed at which the ore is fed to and discharged from the reaction chamber 10 defines, of course, the speed of movement of the ore through the chamber. This rate of movement of the ore through the reaction chamber depends, among other factors, upon the particle size of the ore, the concentration of iron in the ore, the cross-section of the reaction chamber and the concentration and rapidity with which the reducing gases and oxidizing gases, as well as the inert heat transfer gases, are introduced into the chamber. Since the movement of the ore through the reaction chamber is dependent on so many factors which are peculiar to each installation, the correct rate of movement must be determined by the results achieved. For example, substantially all of the hematite should be transformed to gamma hematite, so that the discharge from the hopper 28 should be almost completely magnetic hematite with only a little magnetite mixed therein.

The reducing gas is introduced through the pipe 32 into the manifold 34 and passes through ports 35—35, under the skirt 36 and into the interior of the reaction chamber 10. The skirt 36 forces the reducing gases downwardly and inwardly so that the direction of the reducing gases is that indicated by the arrows in the accompanying drawing. The reducing zone is substantially coextensive with the by-pass manifold 42. The oxidizing gas is introduced through the pipe 38 into the manifold 39 and into the interior of the reaction chamber 10 through ports 40—40. Here again, the skirt 41 forces the oxidizing medium downwardly and inwardly so that the path of these gases is that shown in the accompanying drawing. The oxidizing medium may be introduced through the manifold 54 instead of, or in addition to, the manifold 39.

The reducing gases and oxidizing gases move upwardly and combine in the preheating zone to provide an inert heat transfer gas. The heat transfer gas is used partially to heat the hopper 14 by circulation through the heating chamber 61, and a portion is drawn off through the exhaust duct 64, or alternatively, is permitted to escape up through the opening 20 and out of the top of the feed hopper 14 when the lid has been removed. Substantially all of the heat transfer gases, however, pass through the filter box 49 and down through the return conduit 53. The blower 55 forces the gases at a predetermined rate back into the reaction chamber through the manifold 54 and ports 57—57. The inert heat transfer gas passes underneath the skirt 58 and upwardly through the reaction chamber 10 carrying with it the oxidizing gas.

The by-pass manifold represents a low pressure area inasmuch as there is a pressure drop from the lower ports 44—44 to the upper ports 45—45 due to the large amount of ore packed between these points within the reaction chamber 10. Consequently, the heat transfer gas is carried out through the lower ports 44—44 into the by-pass manifold 42, and continues its upward journey by leaving the by-pass manifold 42 through the upper ports 45—45, and thence into the chamber 10 where it intermingles with the gas resulting from the reduction step. It is thus seen that the gases in the system disclosed in the accompanying drawings move in a cyclical fashion, passing upwardly through the reaction chamber 10 and downwardly through the return conduit 53.

The residual gases from the oxidizing medium and reducing gas intermingle in the upper portion of the reducing zone to produce the heat transfer gas. This heat transfer gas preheats the ore in the reaction chamber 10 as it passes upwardly therethrough, and also passes into the heating chamber 61 to additionally preheat the ore in the feed hopper 14. Since the apparatus is a constant volume apparatus, it is necessary to remove at least a portion of these preheating gases either through the exhaust duct 64 or through the feed hopper 14 (having the lid removed therefrom). Most of the heat transfer gas, however, passes into the filter box 49 down and around the baffle plates 50, 51 and 52 in order to remove therefrom any sediment picked up by the gases during their passage through the iron ore. The heat transfer gas is then conducted through the return conduit 53 and pumped into the manifold 54 by means of the blower 55. As it passes outwardly through ports 57—57 and underneath the skirt 58, the heat transfer gas cools the gamma hematite that has been formed by the oxidizing action so that it will leave the reaction chamber at a temperature not exceeding about 250° F.

It will be obvious to one skilled in the art that the method comprising the present invention may be practiced using apparatus differing materially from the single embodiment shown in the accompanying drawings. Furthermore, it will be evident that a large number of variations may be made in the apparatus shown in the accompanying drawings without departing from the spirit of the invention.

Although the movement of the ore through the reaction chamber 10 has been described as a constant movement, it will be apparent to those skilled in the art that intermittent movement may be employed. The present method may be practiced in devices now on the market with but a few alterations, and may employ apparatus features that are well known.

While this invention has been described in its preferred embodiment, it is to be understood that the words that have been used are words of description rather than of limitation, and that changes within the purview in the appended claims may be made without departing from the true scope and spirit of this invention.

What is claimed is:

1. In a process for obtaining iron values from iron ores including preheating the ore to a temperature of at least 660° F., reducing the preheated ore to magnetite, and oxidizing the magnetite to magnetic hematite at a temperature of from 390° F. to 950° F., the steps which comprise collecting the gases resulting from the reducing and the oxidizing reactions to provide an inert heat transfer medium, passing the heat transfer medium through the hot magnetic hematite to cool the product and to impart heat to the heat transfer medium, intermingling the heated heat transfer medium with an oxidizing gas during the oxidizing action, conducting the heated heat transfer medium directly from the oxidizing zone to the preheating zone where the heat transfer medium preheats the unheated ore, and recycling the cooled heat transfer medium through the hot magnetic hematite to thus continue the process.

2. In a process for obtaining iron values from iron ores including preheating the ore, reducing the preheated ore to magnetite using a reducing gas containing a gas taken from the group consisting of carbon monoxide and free hydrogen, and oxidizing the magnetite to magnetic hematite with an oxidizing medium comprising oxygen in an inert gas, the steps which comprise collecting the gases resulting from the reducing and oxidizing reactions to provide an inert heat transfer gas, passing the heat transfer gas through the hot magnetic hematite to cool the product to at least 250° F., and to impart heat to the heat transfer gas, conducting the heat transfer gas through the ore that is being oxidized in order to exchange heat from the reaction to the heat transfer gas and to maintain the temperature of the reaction from 390° F. to 950° F., passing the hot heat transfer gas directly from the oxidizing zone through the unheated ore to preheat it to a temperature of at least 700° F., and simultaneously reducing the temperature of the heat transfer gas to less than 250° F., and recirculating the heat transfer gas through the hot magnetic hematite and thus continue the process.

3. In a process for obtaining iron values from ores containing at least 15% by weight of iron as hematite, which process includes preheating the ore, reducing the preheated ore to magnetite with a reducing gas containing a gas taken from the group consisting of free hydrogen and free carbon monoxide, oxidizing the magnetite to magnetic hematite with an oxidizing medium comprising air, the steps which comprise collecting the gases resulting from the reducing and oxidizing reactions to provide an inert heat transfer gas, passing the heat transfer gas through the hot magnetic hematite to transfer heat from the magnetic hematite to the gas, diluting the oxidizing medium with the heated heat transfer gas during the oxidizing reaction in order to maintain the heat of reaction from 390° F. to 930° F., conducting the heat transfer gas directly from the oxidizing zone to the unheated ore to preheat it to a temperature of at least 730° F., and simultaneously reducing the temperature of the heat transfer gas to not more than 250° F., and recirculating the cooled heat transfer gas through the hot magnetic hematite to thus continue the process.

4. A continuous process for treating iron ores to produce magnetizable magnetic hematite from the hematite contained therein, which comprises passing the ore to be treated through a reaction chamber, preheating the ore as it enters the reaction chamber to at least 730° F., reducing the preheated hematite to magnetite in a zone immediately adjacent the preheating zone, oxidizing the magnetite to magnetic hematite at a temperature of from 390° F. to 950° F., and circulating a heat transfer gas through the reaction chamber in a direction opposite to the movement of the ore therethrough in order to transfer the heat generated by the oxidation of the magnetite to magnetic hematite to the preheating zone, and recirculating the cooled heat transfer gas back through the reaction chamber in order to continue the cycle.

5. An exothermic process for obtaining iron values from iron ore including the steps of preheating the ore to a temperature of at least 660° F., reducing the preheated ore to magnetite, oxidizing sufficient of said magnetite to magnetic hematite at a temperature of from 390° F. to 950° F. so as to provide sufficient heat to preheat additional iron ore to a temperature of at least 660° F., and utilizing said heat obtained from said oxidation step to preheat said additional iron ore.

6. An exothermic process for obtaining iron values from iron ore including the steps of preheating the ore to a temperature of at least 660° F., reducing the preheated ore to magnetite, oxidizing sufficient of said magnetite to magnetic hematite at a temperature of from 390° F. to 950° F. so as to provide sufficient heat to preheat additional iron ore to a temperature of at least 660° F., and transmitting said heat obtained from said oxidation step to said additional iron ore for the purpose of preheating said iron ore.

References Cited in the file of this patent

UNITED STATES PATENTS

| Number | Name | Date |
| --- | --- | --- |
| 1,645,968 | Percy | Oct. 18, 1927 |
| 2,074,013 | Bradley | Mar. 16, 1937 |
| 2,086,201 | Zeisberg | July 6, 1937 |
| 2,120,474 | Stimmel et al. | June 14, 1938 |
| 2,242,257 | Muskat | May 20, 1941 |
| 2,245,076 | Muskat et al. | June 10, 1941 |
| 2,296,841 | Gardner | Sept. 29, 1942 |
| 2,384,971 | Silvasy et al. | Sept. 18, 1945 |
| 2,387,882 | Clark | Oct. 30, 1945 |
| 2,528,553 | Royster | Nov. 7, 1950 |
| 2,596,954 | Heath | May 13, 1952 |

OTHER REFERENCES

"Nature," vol. 115 (1925), page 930.
Philosophical Magazine, vol. 50, 1925. Pages 399–408, pages 400–401 pertinent. Article by Welo and Baudisch.
Chemical Reviews, vol. 15, Aug. 1934, pages 45–97, inclusive. Pages 54–56 pertinent.